US010705710B2

(12) United States Patent
Takami

(10) Patent No.: US 10,705,710 B2
(45) Date of Patent: Jul. 7, 2020

(54) WEB PAGE CONTENT INSERTION BASED ON SCROLL OPERATION

(75) Inventor: Shinya Takami, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 493 days.

(21) Appl. No.: 14/118,802

(22) PCT Filed: Jan. 27, 2012

(86) PCT No.: PCT/JP2012/051789
§ 371 (c)(1),
(2), (4) Date: Nov. 19, 2013

(87) PCT Pub. No.: WO2012/164966
PCT Pub. Date: Dec. 6, 2012

(65) Prior Publication Data
US 2014/0089787 A1  Mar. 27, 2014

(30) Foreign Application Priority Data

May 31, 2011  (JP) ................................ 2011-121897

(51) Int. Cl.
*G06F 3/0485* (2013.01)
*G06Q 30/02* (2012.01)
(Continued)

(52) U.S. Cl.
CPC .............. *G06F 3/0485* (2013.01); *G06F 3/14* (2013.01); *G06F 16/95* (2019.01); *G06F 16/986* (2019.01);
(Continued)

(58) Field of Classification Search
CPC .......... G06F 3/0485; G06F 16/95; G06F 3/14; G06F 16/986; G06F 40/143; G06F 40/14;
(Continued)

(56) References Cited

U.S. PATENT DOCUMENTS 6,710,790 B1\* 3/2004 Fagioli .................. G06F 3/0481
715/778
6,934,743 B2\* 8/2005 Huat .................... G06Q 10/107
707/999.01

(Continued)

FOREIGN PATENT DOCUMENTS

JP  2009-288119 A  12/2009
JP  2010-231307 A  10/2010

*Primary Examiner* — Kavita Padmanabhan
*Assistant Examiner* — Tyler Schallhorn
(74) *Attorney, Agent, or Firm* — Sughrue Mion, PLLC

(57) ABSTRACT

Provided are a device and a method which facilitate continued focusing of a used on specific content information by increasing the opportunities for said content information to appear (be exposed) even in case that said specific content information has been moved off the display screen by scrolling. At least one set of copy content information is generated which is a copy of focus content information identified from content information contained in a content list displayed on the display screen of a terminal device. Then, said generated copy content information is inserted at any insertion position in the sequence of the content list, and said inserted copy content information is displayed on the display screen in response to operations in which the user scrolls the display content on the display screen.

7 Claims, 10 Drawing Sheets

US 10,705,710 B2

Page 2

(51) Int. Cl.
*G06F 16/95* (2019.01)
*G06F 3/14* (2006.01)
*G06F 16/958* (2019.01)
*G06F 40/143* (2020.01)

(52) U.S. Cl.
CPC ......... G06Q 30/02 (2013.01); G06Q 30/0277 (2013.01); *G06F 40/143* (2020.01); *G09G 2370/027* (2013.01)

(58) Field of Classification Search
CPC ............... G06Q 30/0244; G06Q 30/02; G06Q 30/0277; G09G 2370/027
See application file for complete search history.

(56) References Cited

U.S. PATENT DOCUMENTS

| | | | | |
|---|---|---|---|---|
| 7,379,976 | B2* | 5/2008 | Huat | G06Q 10/107 709/217 |
| 7,904,062 | B2* | 3/2011 | Ashkenazi | G06Q 30/02 455/414.1 |
| 8,005,717 | B2* | 8/2011 | Joo | G06Q 30/02 705/1.1 |
| 8,209,623 | B2* | 6/2012 | Barletta | G06F 3/04883 715/776 |
| 8,271,898 | B1* | 9/2012 | Mattos | G06F 3/0485 345/473 |
| 8,359,350 | B2 | 1/2013 | Urakawa | |
| 8,359,545 | B2* | 1/2013 | Pixley | G06F 3/03543 345/157 |
| 8,631,356 | B2* | 1/2014 | Lai | G06Q 30/0251 715/835 |
| 8,766,984 | B2* | 7/2014 | Mark | G06F 3/0485 345/428 |
| 9,299,030 | B1* | 3/2016 | Hotchkies | G06N 5/046 |
| 10,175,873 | B2* | 1/2019 | Desai | G06F 3/0485 |
| 10,304,160 | B2* | 5/2019 | Yamamoto | G06F 13/00 |
| 2002/0133565 | A1* | 9/2002 | Huat | G06Q 10/107 709/218 |
| 2006/0031419 | A1* | 2/2006 | Huat | G06Q 10/107 709/219 |
| 2006/0206380 | A1* | 9/2006 | Joo | G06Q 30/02 705/14.49 |
| 2006/0236258 | A1* | 10/2006 | Othmer | G06Q 30/0243 715/774 |
| 2007/0074096 | A1* | 3/2007 | Lee | G06F 17/30056 715/210 |
| 2007/0168413 | A1* | 7/2007 | Barletta | G06F 3/04883 709/203 |
| 2008/0103899 | A1* | 5/2008 | Blinnikka | G06Q 30/02 705/14.69 |
| 2009/0100373 | A1* | 4/2009 | Pixley | G06F 3/03543 715/786 |
| 2010/0198697 | A1* | 8/2010 | Brown | G06Q 30/02 705/14.73 |
| 2011/0035263 | A1* | 2/2011 | Ramanathan | G06F 3/0485 705/14.4 |
| 2012/0044251 | A1* | 2/2012 | Mark | G06F 3/0485 345/474 |
| 2012/0064946 | A1* | 3/2012 | Voetberg | H04N 1/00411 455/566 |
| 2012/0159393 | A1* | 6/2012 | Sethi | G06F 17/30902 715/830 |
| 2012/0218310 | A1* | 8/2012 | Shinohara | G09G 5/34 345/670 |
| 2012/0272136 | A1* | 10/2012 | Takami | G06F 17/30867 715/234 |
| 2013/0088520 | A1* | 4/2013 | Mak | G06F 3/0485 345/684 |
| 2013/0132894 | A1* | 5/2013 | Pixley | G06F 3/03543 715/786 |
| 2013/0159834 | A1* | 6/2013 | Johnson | G06F 3/0485 715/234 |
| 2014/0095514 | A1* | 4/2014 | Filev | G06F 17/212 707/748 |
| 2014/0189558 | A1* | 7/2014 | Takami | G06F 3/0481 715/767 |
| 2014/0208259 | A1* | 7/2014 | Desai | G06F 3/04883 715/784 |
| 2015/0324376 | A1* | 11/2015 | Jeon | G06F 16/957 715/234 |
| 2016/0283460 | A1* | 9/2016 | Weald | G06Q 30/0277 |
| 2017/0200300 | A1* | 7/2017 | Adams | G06T 13/80 |
| 2017/0221106 | A1* | 8/2017 | Sanghavi | G06Q 30/0267 705/14.64 |
| 2018/0040102 | A1* | 2/2018 | Yamamoto | G06F 13/00 |

* cited by examiner

FIG.3

| MEMBER INFORMATION DB |
|---|
| MEMBER ID |
| NICKNAME |
| NAME OR TITLE |
| ADDRESS |
| PHONE NUMBER |
| EMAIL ADDRESS |
| ······· |

21

(A)

| EXHIBITED ITEM INFORMATION DB ||
|---|---|
| MEMBER ID OF EXHIBITOR ||
| NICKNAME OR NAME OF EXHIBITOR ||
| EXHIBITED ITEM INFORMATION | EXHIBITED ITEM ID |
| | NAME OF ITEM FOR SALE |
| | DESCRIPTION OF ITEM FOR SALE |
| | IMAGE DATA OF ITEM FOR SALE |
| | PRICE OF ITEM FOR SALE |
| | ······· |
| PRESENCE OR ABSENCE OF ATTENTION SETTING ||
| ······· ||

| ITEM FOR SALE IMAGE | ITEM FOR SALE NAME | PRICE | EXHIBITOR NAME | ... | |
|---|---|---|---|---|---|
| | AAA SNEAKERS Free | 1,000 YEN | A SHOP | .... | ←C3 |
| | BBB SNEAKERS WHITE | 800 YEN | B SHOP | .... | ←C4 |
| | SHOES | 200 YEN | C SHOP | .... | ←C5 |
| | SANDALS | 800 YEN | A SHOP | .... | ←C6 |
| | AAA SNEAKERS RED | 1,000 YEN | D SHOP | .... | ←C7 (ATTENTION) |
| | CCC SNEAKERS | 5,000 YEN | E SHOP | .... | ←C8 |
| | BOOTS | 6,700 YEN | F SHOP | .... | ←C9 |

ARRANGEMENT : | NORMAL | PRICE IS LOW | PRICE IS HIGH | SORT BY DATE | MANY COMMENTS

NARROWING CONDITION : ☐IN-STOCK ☐INCLUDING SHIPPING COST ☑CARD OK ☐APPLICABLE TO GIFT ☐THERE ARE COMMENTS

1ST ITEM ~ 100TH ITEM (TOTAL OF 350 ITEMS)   NEXT 100 ITEMS 1 | 2 | 3

SEARCH KEYWORD

SEARCH FOR ITEM FOR SALE

50

(B)

| | | | | | |
|---|---|---|---|---|---|
| | SANDALS | 800 YEN | A SHOP | .... | ←C6 |
| | AAA SNEAKERS RED | 1,000 YEN | D SHOP | .... | ←C7 (ATTENTION) |
| | CCC SNEAKERS | 5,000 YEN | E SHOP | .... | ←C8 |
| | BOOTS | 6,700 YEN | F SHOP | .... | ←C9 |
| | AAA SNEAKERS GREEN | 1,100 YEN | G SHOP | .... | ←C10 |
| | α SNEAKERS | 800 YEN | H SHOP | .... | ←C11 |
| | AAA SNEAKERS RED | 1,000 YEN | D SHOP | .... | ←C7 (COPY) |
| | RUBBER BOOTS | 100 YEN | I SHOP | .... | ←C12 |
| | BOOTS β | 3,000 YEN | A SHOP | .... | ←C13 |
| | HIGH HEELS BB | 1,700 YEN | B SHOP | .... | ←C14 |

SCROLLING

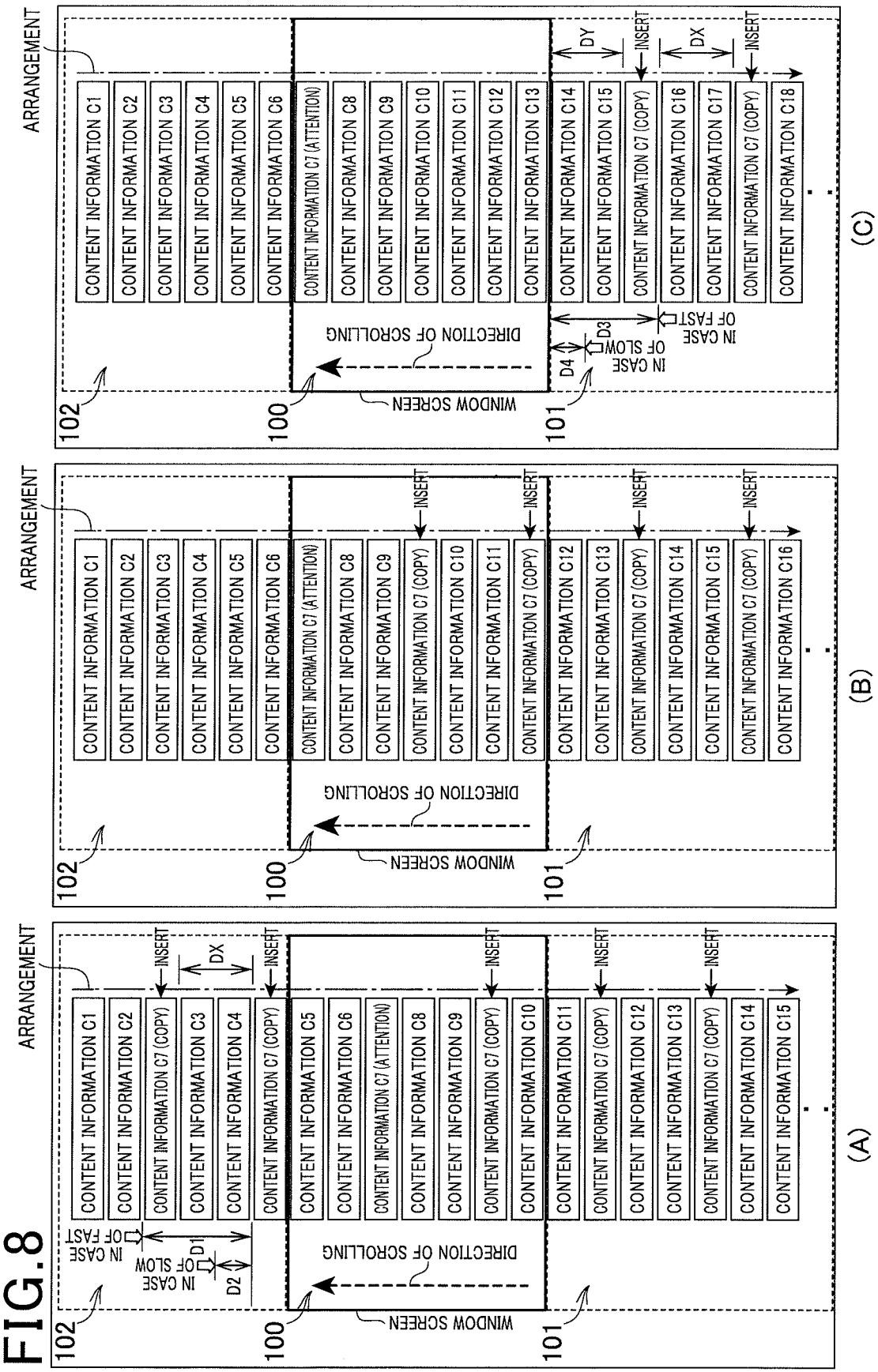

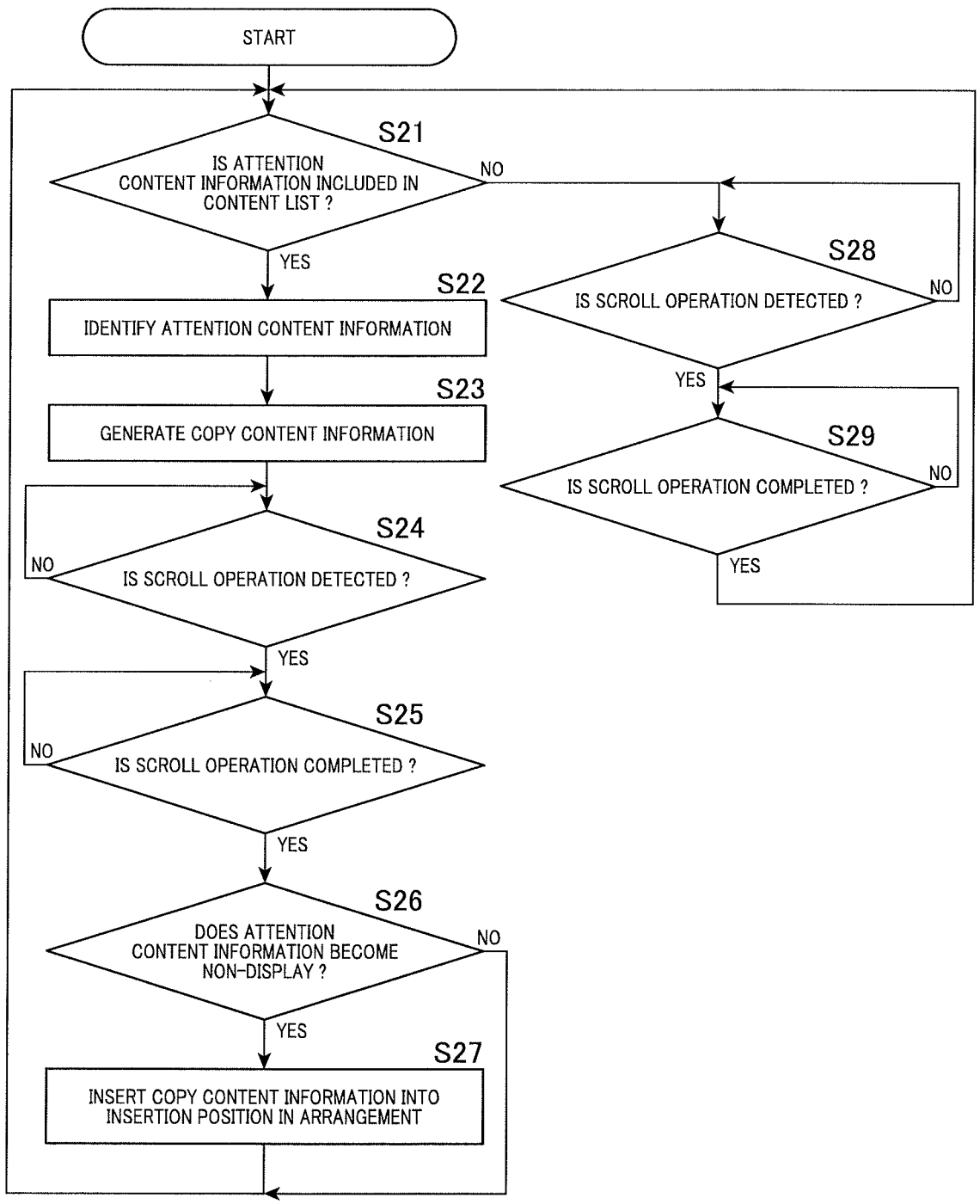

FIG.10

SCROLLING STARTS

(A)

| ITEM FOR SALE IMAGE | ITEM FOR SALE NAME | PRICE | EXHIBITOR NAME | ... | |
|---|---|---|---|---|---|
| | AAA SNEAKERS Free | 1,000 YEN | A SHOP | .... | ←C3 |
| | BBB SNEAKERS WHITE | 800 YEN | B SHOP | .... | ←C4 |
| | SHOES | 200 YEN | C SHOP | .... | ←C5 |
| | SANDALS | 800 YEN | A SHOP | .... | ←C6 |
| | AAA SNEAKERS RED | 1,000 YEN | D SHOP | .... | ←C7 (ATTENTION) |
| | CCC SNEAKERS | 5,000 YEN | E SHOP | .... | ←C8 |
| | BOOTS | 6,700 YEN | F SHOP | .... | ←C9 |

Arrangement: NORMAL | PRICE IS LOW | PRICE IS HIGH | SORT BY DATE | MANY COMMENTS
Narrowing Condition: ☐IN-STOCK ☐INCLUDING SHIPPING COST ☑CARD OK ☐APPLICABLE TO GIFT ☐THERE ARE COMMENTS
1ST ITEM ~ 100TH ITEM (TOTAL OF 350 ITEMS)    NEXT 100 ITEMS 1 | 2 | 3

SEARCH KEYWORD / SEARCH FOR ITEM FOR SALE

[SCROLLING]

SCROLLING STOPS

(B)

| | CCC SNEAKERS | 5,000 YEN | E SHOP | .... | ←C8 |
|---|---|---|---|---|---|
| | BOOTS | 6,700 YEN | F SHOP | .... | ←C9 |
| | AAA SNEAKERS GREEN | 1,100 YEN | G SHOP | .... | ←C10 |
| | α SNEAKERS | 800 YEN | H SHOP | .... | ←C11 |
| | RUBBER BOOTS | 100 YEN | I SHOP | .... | ←C12 |
| | BOOTS β | 3,000 YEN | A SHOP | .... | ←C13 |
| | SHOES | 1,000 YEN | J SHOP | .... | ←C14 |
| | SHOES | 1,200 YEN | C SHOP | .... | ←C15 |
| | AAA SNEAKERS RED | 1,000 YEN | D SHOP | .... | ←C7 (COPY) |
| | HIGH HEELS BB | 1,700 YEN | B SHOP | .... | ←C16 |

[RESTORATION]

WEB PAGE CONTENT INSERTION BASED ON SCROLL OPERATION

CROSS REFERENCE TO RELATED APPLICATIONS

This application is a National Stage of International Application No. PCT/JP2012/051789, filed on Jan. 27, 2012, which claims priority from Japanese Patent Application No. 2011-121897, filed on May 31, 2011, the contents of all of which are incorporated herein by reference in their entirety.

TECHNICAL FIELD

The present invention relates to a field of a technique to cause specific content information to attract attention in a web page provided from a web site on the Internet.

BACKGROUND ART

There are a large number of web sites on the Internet and a user terminal connected to the Internet displays a web page acquired from a web site on a display screen by a web browser. A lot of content information is arranged on such a web page and content information that cannot be fully displayed on one screen can be displayed by a scroll operation by a user. For example, on a web page provided from a shopping site or an auction site, a list of content information (including item for sale images, character strings of item for sale description and the like) related to each exhibited item for sale is displayed. The display content of the list is scrolled by, for example, a scroll operation.

Meanwhile, it is difficult for the user of the user terminal to determine whether or not there is content information including desired content (for example, character string) at a glance while scrolling display content of the web page. On the other hand, Patent Document 1 discloses a technique for highlighting a map element such as, for example, a municipality name when the map is scrolled. If such a technique is applied, it is assumed that the user can determine whether or not there is content information including desired content at a glance while scrolling display content of the web page.

CITATION LIST

Patent Document

Patent Document 1: Japanese Patent Application Laid-Open No. 2009-288119

SUMMARY OF INVENTION

Technical Problem to be Solved by the Invention

However, the technique disclosed in the Patent Document 1 cannot cause the user to pay attention to a character string framed out (in other words, deleted from the display screen) by scrolling. In particular, on a web page provided from a shopping site or an auction site, for example, a list of a lot of content information of as many as hundreds of pieces is displayed. Therefore, once the character string is framed out by scrolling, the character string is not displayed again until the direction of the scrolling is reversed, so that it is difficult to cause the user to pay attention to the character string.

The present invention is made in view of the above problem and the like, and an object of the present invention is to provide an information processing device, an information processing method, an information processing program, and a recording medium in which the information processing program is recorded, which can facilitate specific content information to be paid attention to by a user by increasing opportunities for the specific content information to appear (be exposed) even in case that the specific content information is moved out of the display screen by scrolling.

Solution to the Problem

In order to achieve the above described problems, an invention is characterized in that an information processing device that causes at least a part of pieces of content information among a plurality of pieces of content information to be displayed on a display screen of a terminal device according to a predetermined arrangement, the information processing device comprises: an attention content information identification means that identifies attention content information that is set in advance as content information to which a user is caused to pay attention from among the plurality of pieces of content information; an insertion means that causes at least one piece of copy content information which is a copy of the attention content information identified by the attention content information identification means to be inserted into a certain insertion position in the arrangement; and a display control means that causes the copy content information inserted by the insertion means to be displayed on the display screen according to a user operation to scroll display content including at least a part of the plurality of pieces of content information.

According to this invention, it is configured so as to cause the copy content information of the attention content information included in a plurality of pieces of content information to be inserted into a certain insertion position in a predetermined arrangement and cause the copy content information to be displayed on the display screen, according to a user operation to scroll. Therefore, even in case that the attention content information is moved out of the display screen by the scrolling, it is possible to increase opportunities for the attention content information to appear (be exposed) and facilitate the attention content information to be paid attention to by the user.

An invention is characterized in that the information processing device, wherein the display control means causes the copy content information to be displayed on the display screen during scrolling after the scrolling is started.

According to this invention, it is possible to facilitate the content information to be paid attention to by the user by increasing opportunities for the attention content information to appear while preventing the content information from disturbing user's browsing more than necessary.

An invention is characterized in that the information processing device, wherein the display control means causes all or part of the copy content information displayed on the display screen to be non-display when the scrolling is stopped.

According to this invention, when the scrolling is stopped, it is possible to prevent the copy content information of the attention content information from being an obstacle for the user to browse other content information.

An invention is characterized in that the information processing device, wherein the display control means causes at least one piece of the copy content information among a plurality of pieces of the copy content information to be continuously displayed and causes the other pieces of the copy content information except for the copy content information that is to be continuously displayed to be non-display when the scrolling is stopped.

According to this invention, when the scrolling is stopped, it is possible to prevent the copy content information of the attention content information from being an obstacle for the user to browse other content information more than necessary and it is also possible to facilitate the user to continuously pay attention to (facilitate the user to pay attention to) the attention content information.

An invention is characterized in that the information processing device, further comprises: a direction information acquisition means that acquires direction information indicating a direction of the scrolling, wherein, on the basis of the direction information acquired by the direction information acquisition means, the insertion means identifies a range that will be a display target displayed on the display screen by the scrolling from among a non-display target range that is not a display target displayed on the display screen before the scrolling is started and causes the copy content information to be inserted into the insertion position in the identified range.

According to this invention, it is possible to cause the copy content information of the attention content information to repeatedly and effectively appear on the display screen according to the direction of the scrolling during the scrolling.

An invention is characterized in that the information processing device, further comprises: a speed information acquisition means that acquires speed information indicating a speed of the scrolling, wherein the insertion means changes the number of insertions of the copy content information according to a speed indicated by the speed information acquired by the speed information acquisition means.

According to this invention, it is possible to cause the copy content information of the attention content information to repeatedly appear on the display screen with the number of pieces of copy content information for the user to easily see the copy content information according to the speed of the scrolling during the scrolling.

An invention is characterized in that the information processing device, further comprises: a speed information acquisition means that acquires speed information indicating a speed of the scrolling, wherein in case that the insertion means causes a plurality of pieces of the copy content information to be inserted into a plurality of different insertion positions, the insertion means changes an insertion interval of the copy content information according to a speed indicated by the speed information acquired by the speed information acquisition means.

According to this invention, it is possible to cause the copy content information of the attention content information to repeatedly appear on the display screen at intervals for the user to easily to see the copy content information according to the speed of the scrolling during the scrolling.

An invention is characterized in that the information processing device, wherein the insertion means causes the copy content information to be inserted into the insertion position when the scrolling is stopped and thereby the display control means causes the copy content information to be displayed on the display screen when the scrolling is stopped.

According to this invention, when the scrolling is stopped, the copy content information of the attention content information is caused to appear, so that it is possible to facilitate the copy content information to be paid attention to by the user.

An invention is characterized in that the information processing device, wherein, before the scrolling is started, the insertion means causes the copy content information to be inserted into a plurality of the insertion positions in a non-display state at insertion intervals shorter than a length of the display screen in a direction in parallel with the direction of the scrolling, and the display control means switches the copy content information located in the display screen to a display state when the scrolling is stopped and there by causes the copy content information to be displayed on the display screen.

According to this invention, when the scrolling is stopped, the copy content information of the attention content information is caused to appear, so that it is possible to facilitate the copy content information to be paid attention to by the user.

An invention is characterized in that an information processing method performed by a computer that causes at least a part of pieces of content information among a plurality of pieces of content information to be displayed on a display screen of a terminal device according to a predetermined arrangement, the information processing method comprises: a step of identifying attention content information that is set in advance as content information to which a user is caused to pay attention from among the plurality of pieces of content information; a step of causing at least one piece of copy content information which is a copy of the identified attention content information to be inserted into a certain insertion position in the arrangement; and a step of causing the inserted copy content information to be displayed on the display screen according to a user operation to scroll display content including at least a part of the plurality of pieces of content information.

An invention is characterized in that an information processing program that causes a computer, which causes at least a part of pieces of content information among a plurality of pieces of content information to be displayed on a display screen of a terminal device according to a predetermined arrangement, to function as: an attention content information identification means that identifies attention content information that is set in advance as content information to which a user is caused to pay attention from among the plurality of pieces of content information; an insertion means that causes at least one piece of copy content information which is a copy of the attention content information identified by the attention content information identification means to be inserted into a certain insertion position in the arrangement; and a display control means that causes the copy content information inserted by the insertion means to be displayed on the display screen according to a user operation to scroll display content including at least a part of the plurality of pieces of content information.

An invention is characterized in that a recording medium in which an information processing program is recorded, the information processing program causing a computer, which causes at least a part of pieces of content information among a plurality of pieces of content information to be displayed on a display screen of a terminal device according to a predetermined arrangement, to function as: an attention content information identification means that identifies attention content information that is set in advance as content information to which a user is caused to pay attention from among the plurality of pieces of content information; an insertion means that causes at least one piece of copy content information which is a copy of the attention content information identified by the attention content information identification means to be inserted into a certain insertion position in the arrangement; and a display control means that causes the copy content information inserted by the insertion means to be displayed on the display screen according to a user operation to scroll display content including at least a part of the plurality of pieces of content information.

Effect of the Invention

According to the present invention, it is configured so as to cause the copy content information of the attention content information included in a plurality of pieces of content information to be inserted into a certain insertion position in a predetermined arrangement and cause the copy content information to be displayed on the display screen, according to a user operation to scroll. Therefore, even in case that the attention content information is moved out of the display screen by the scrolling, it is possible to increase opportunities for the attention content information to appear (be exposed) and facilitate the attention content information to be paid attention to by the user.

BRIEF DESCRIPTION OF THE DRAWINGS

FIGS. 3(A) and 3(B) are diagrams showing examples of content registered in various databases.

FIGS. 7(A) and 7(B) are diagrams showing display examples of web pages according to Example 1.

FIGS. 8(A) to 8(C) are conceptual diagrams showing insertion positions of copy content information in arrangements.

FIG. 9 is a flowchart showing a copy content information display process according to Example 2.

FIGS. 10(A) and 10(B) are diagrams showing display examples of web pages according to Example 2.

MODES FOR CARRYING OUT THE INVENTION

Hereinafter, an embodiment of the present invention will be described with reference to the drawings. The embodiment described below is an embodiment where the present invention is applied to an information providing system.

[1. Schematic Configuration and Function of Information Providing System]

First, a configuration and a schematic function of an information providing system S according to an embodiment of the present invention will be described with reference to FIG. 1.

Figure 1:
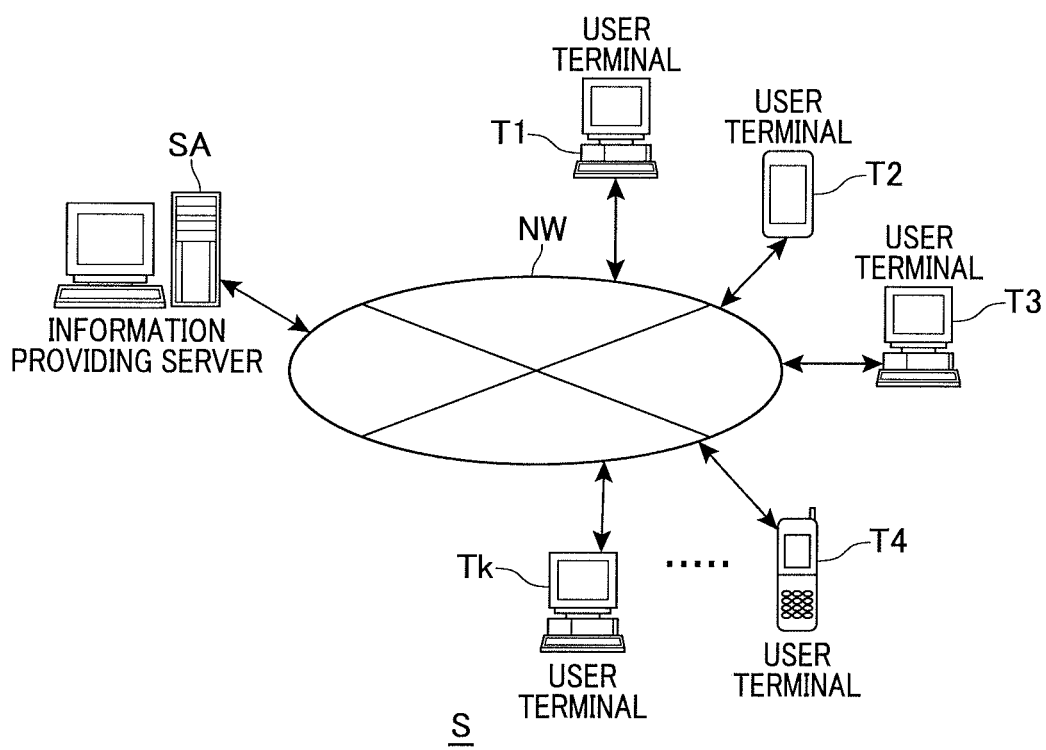
FIG. 1 is a diagram showing an example of a schematic configuration of an information providing system S according to an embodiment.

FIG. 1 is a diagram showing an example of a schematic configuration of the information providing system S according to the present embodiment.

As shown in FIG. 1, the information providing system S includes a plurality of user terminals (an example of a terminal device) Tn (n=1, 2, 3, . . . , k) and an information providing server (an example of an information processing device) SA. Each of the user terminals Tn and the information providing server SA is connected to a network NW. The network NW includes, for example, the Internet, a dedicated communication line (for example, a CATV (Community Antenna Television) line), a mobile communication network (including a base station and the like), a gateway and the like.

The information providing server SA is a server (for example, a web server, a database server and the like) installed to operate, for example, a shopping site or an auction site.

Figure 2:
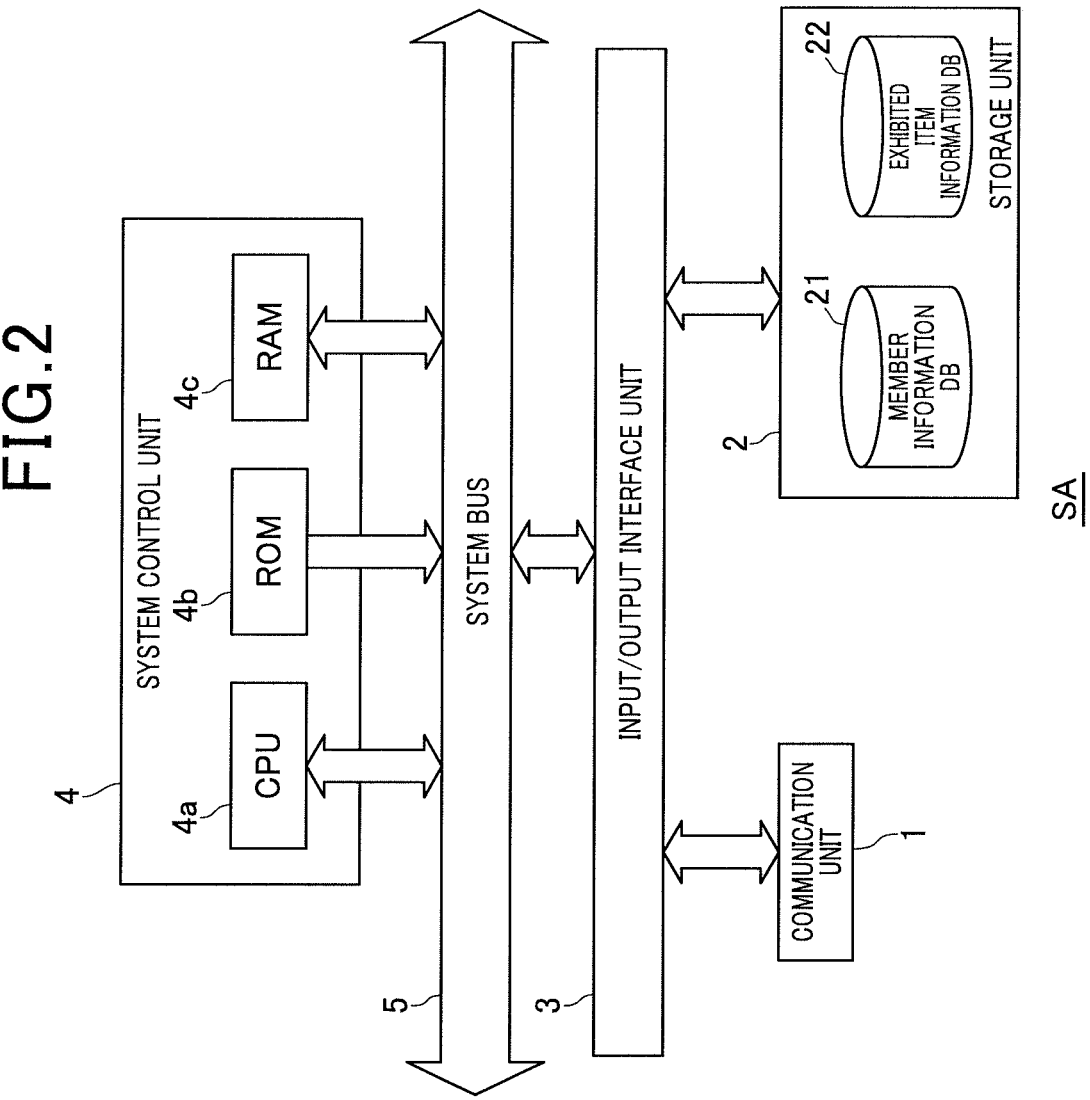
FIG. 2 is a block diagram showing an example of a schematic configuration of an information providing server SA according to the embodiment.

FIG. 2 is a block diagram showing a schematic configuration example of the information providing server SA according to the present embodiment. As shown in FIG. 2, the information providing server SA includes a communication unit 1, a storage unit 2, an input/output interface unit 3, and a system control unit 4. The system control unit 4 and the input/output interface unit 3 are connected through a system bus 5.

The communication unit 1 connects to the network NW and controls communication state with the user terminals Tn.

The storage unit 2 includes, for example, a hard disk drive and the like and stores various programs such as an operating system, a server program and the like. For example, the server program may be distributed from a predetermined server or the like through the network NW or may be recorded in a recording medium such as a CD (Compact Disc), a DVD (Digital Versatile Disc), or the like to be provided.

The storage unit 2 stores a structured document (for example, an HTML (Hyper Text Markup Language) document, an XHTML document and the like) file constituting a web page to be displayed by the user terminal Tn, a CCS (Cascading Style Sheets) file, an image file, and the like. The web page is a page for displaying a list of content information (hereinafter referred to as a "content list"). The content information includes at least either one of a text and an image. The content information is described as an element collected for each content information by div tags (<div> . . . </div>) in a structured document constituting a web page for example. A plurality of arrangements of the content information in the content list is determined such as, for example, a default setting order, an ascending order of price, a descending order of price, and an order of arrival from the latest. The arrangement is defined (for example, defined by a script (for example, JavaScript (registered trademark))) in the structured document so that the arrangement can be changed according to a sort operation by a user of the user terminal Tn. In the structured document, for example, an order of description of the div tags that define each content information is the default setting order. The content list may be configured by using, for example, Table tag (<Table><Tr><Td> . . . </Td></Tr></Table>) in a structured document constituting a web page.

Further, in the storage unit 2, a member information database (DB) 21 and an exhibited item information database (DB) 22 are constructed. FIGS. 3(A) and 3(B) are diagrams showing examples of content (items) registered in various databases.

In the member information database 21, as shown in FIG. 3(A), a member ID, a nickname, a name or a title, an address, a phone number, an email address, and the like of an individual or a shop which are registered as a member are registered in association with each other for each member.

An individual and a shop which are registered as a member can exhibit an item for sale to be sold through a shopping site or an auction site as an exhibitor.

In the exhibited item information database 22, as shown in FIG. 3(B), a member ID of an exhibitor, a nickname or a name of the exhibitor, exhibited item information related to an exhibited item for sale, the presence or absence of attention setting, and the like are registered in association with each other for each exhibited item. The exhibitor can specify the exhibited item information and the presence or absence of attention setting through a setting screen displayed on the user terminal Tn when exhibiting an item for sale. The exhibitor who performs the attention setting pays a fee required for the attention setting to an administrator.

Here, the exhibited item information includes an exhibited item ID, a name of the item for sale (an item for sale name), a description of the item for sale, image data of the item for sale, a price of the item for sale (in the case of auction, a starting price, a buy it now price and the like), an exhibition period, a delivery method of the item for sale, a settlement method (payment method) of the item for sale, and the like. Here, the exhibited item ID is an identifier uniquely given to each exhibited item (in other words, to each exhibited item for sale).

For example, the image of the item for sale, the name of the item for sale, the price of the item for sale, and an exhibitor name (nickname, name or the like) of the item for sale, and the like are collectively described as content information (elements) of the item for sale by div tags in a structured document constituting a web page (the image is described by, for example, an image file name or a URL of the image file). The exhibited item ID associated with the content information of each item for sale is defined to, for example, each corresponding div tag as an id attribute.

The presence or absence of attention setting indicates whether or not a setting for causing a user (browser) of the user terminal Tn to pay attention to the content information of the item for sale is performed. The content information that is set in advance as content information to which the user is caused to pay attention is referred to as attention content information. The attention content information can be identified by a web browser from the structured document constituting the web page. For example, a number system of an exhibited item ID of attention content information of an item for sale where the attention setting is present is set different from a number system of an exhibited item ID of content information of an item for sale where the attention setting is absent. Or, it may be configured so as to define a value that characterizes content information to be attention content information on a div tag that defines attention content information of an item for sale where the attention setting is present.

The input/output interface unit 3 performs interface processing among the communication unit 1, the storage unit 2, and the system control unit 4.

The system control unit 4 includes a CPU (Central Processing Unit) 4a, a ROM (Read Only Memory) 4b, a RAM (Random Access Memory) 4c, and the like. The system control unit 4, which functions as a computer, performs various processes according to a request from the user terminal Tn by executing a server program. For example, the system control unit 4 transmits a structured document file of a web page and the like for displaying content information to the user terminal Tn through the network NW according to a page request from the user terminal Tn.

Figure 4:
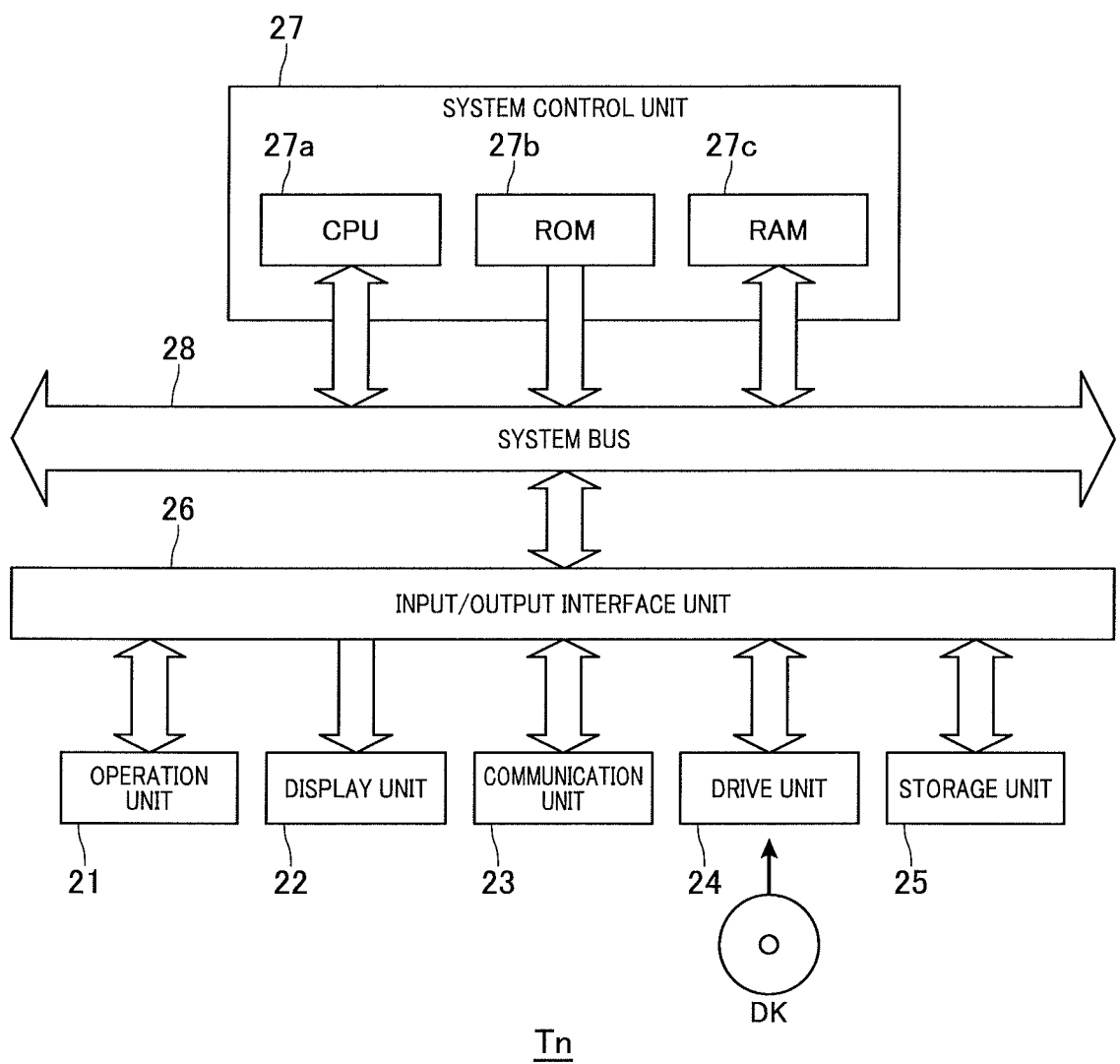
FIG. 4 is a block diagram showing a schematic configuration example of a user terminal Tn according to the embodiment.

Next, FIG. 4 is a block diagram showing a schematic configuration example of the user terminal Tn according to the present embodiment. As shown in FIG. 4, the user terminal Tn includes an operation unit 21, a display unit 22, a communication unit 23, a drive unit 24, a storage unit 25, an input/output interface unit 26, and a system control unit 27. The system control unit 27 and the input/output interface unit 26 are connected through a system bus 28. Examples of the user terminal Tn include a personal computer (PC), a PDA (Personal Digital Assistant), a mobile phone, a smartphone and the like.

Examples of the operation unit 21 include a keyboard, a mouse, a touch panel and the like. In case that the operation unit 21 is operated by a user, an operation signal according to the operation is output to the system control unit 27.

The display unit 22 includes a display for displaying various information. The communication unit 23 connects to the network NW and controls communication state with the information providing server SA and the like. The drive unit 24 reads data and the like from a disk DK (a recording medium) such as, for example, a CD (Compact Disc) and a DVD (Digital Versatile Disk) and records data and the like to the disk DK. The storage unit 25 includes, for example, a hard disk drive and the like and stores an operating system (O/S), a web browser program, and the like.

The system control unit 27 includes a CPU 27a, a ROM 27b, a RAM 27c, and the like. The system control unit 27, which functions as a computer, starts a web browser by executing the web browser program and performs various processes according to an operation on the operation unit 21 by the user (hereinafter referred to as a "user operation"). For example, when the system control unit 27 transmits a page request to the information providing server SA and receives a structured document file and the like of a web page for displaying a content list of item for sale from the information providing server SA, the system control unit 27 displays the web page on a window screen (an example of a display screen) appearing on the display. The window screen is an active display area of the web browser.

Then, the system control unit 27 functions as an attention content information identification means, an insertion means, and a display control means in the present invention, so that the system control unit 27 performs a copy content information display process. In the copy content information display process, the system control unit 27 identifies attention content information from a plurality of pieces of content information included in the content list and causes at least one copy content information which is a copy of the identified attention content information to be inserted into any insertion position in the arrangement in the content list. Here, the insertion position is, for example, a position between content information and content information. Then, the system control unit 27 causes the inserted copy content information to be displayed on the window screen according to a user operation to scroll (move) display content (hereinafter referred to as a "scroll operation") including at least a part of the plurality of pieces of content information. Thereby, it is possible to facilitate the attention content information to be paid attention to by the user by increasing opportunities for the attention content information to appear.

The system control unit 27 scrolls (moves) the display content displayed on the window screen in the horizontal direction (transverse direction), the perpendicular direction (vertical direction), or an oblique direction according to the scroll operation. Specific examples of the scroll operation includes operations where the user rotates a wheel (a button between the left and right buttons) of a mouse, the user moves a scroll bar displayed near the window screen by the drag function of the mouse, the user presses the up, down, left, or right key of the keyboard, the user drags the window screen to move the display content to any direction by using a pointing device such as a mouse and the like, and the user flicks on a touch panel (for example, performs a finger flick operation on the touch panel).

In this way, the copy content information which is a copy of the attention content information is displayed on the window screen, so that the attention content information is repeatedly displayed in appearance. As a form of this repeated display, for example, there are a repetitive display during scrolling and a restoration display. The repetitive display during scrolling is a form in which the copy content information of the attention content information appears repeatedly in the window screen during scrolling. On the other hand, the restoration display is a form in which in case that the attention content information is moved out of the window screen by scrolling, the copy content information of the attention content information appears while the scrolling stops. In this copy content information display process, the system control unit 27 also functions as a direction information acquisition means, a speed information acquisition means, and the like in the present invention. The whole or part of the copy content information display process is defined by, for example, a script (for example, JavaScript (registered trademark)) described in a structured document constituting a web page transmitted to the user terminal Tn. The script is an example of a computer-readable information processing program in the present invention and provided in the HTML document described above by the information providing server SA. For example, the information processing program of the present invention may be distributed from a predetermined server or the like through the network NW or may be recorded in a recording medium such as a CD (Compact Disc), a DVD (Digital Versatile Disc), and the like to be provided. In the present embodiment, the script described above is interpreted by the web browser of the system control unit 27, so that the whole or part of the copy content information display process is performed.

[2. Copy Content Information Display Process]

Next, the copy content information display process according to the present embodiment will be described separately in Example 1 and Example 2.

Example 1

Figure 5:
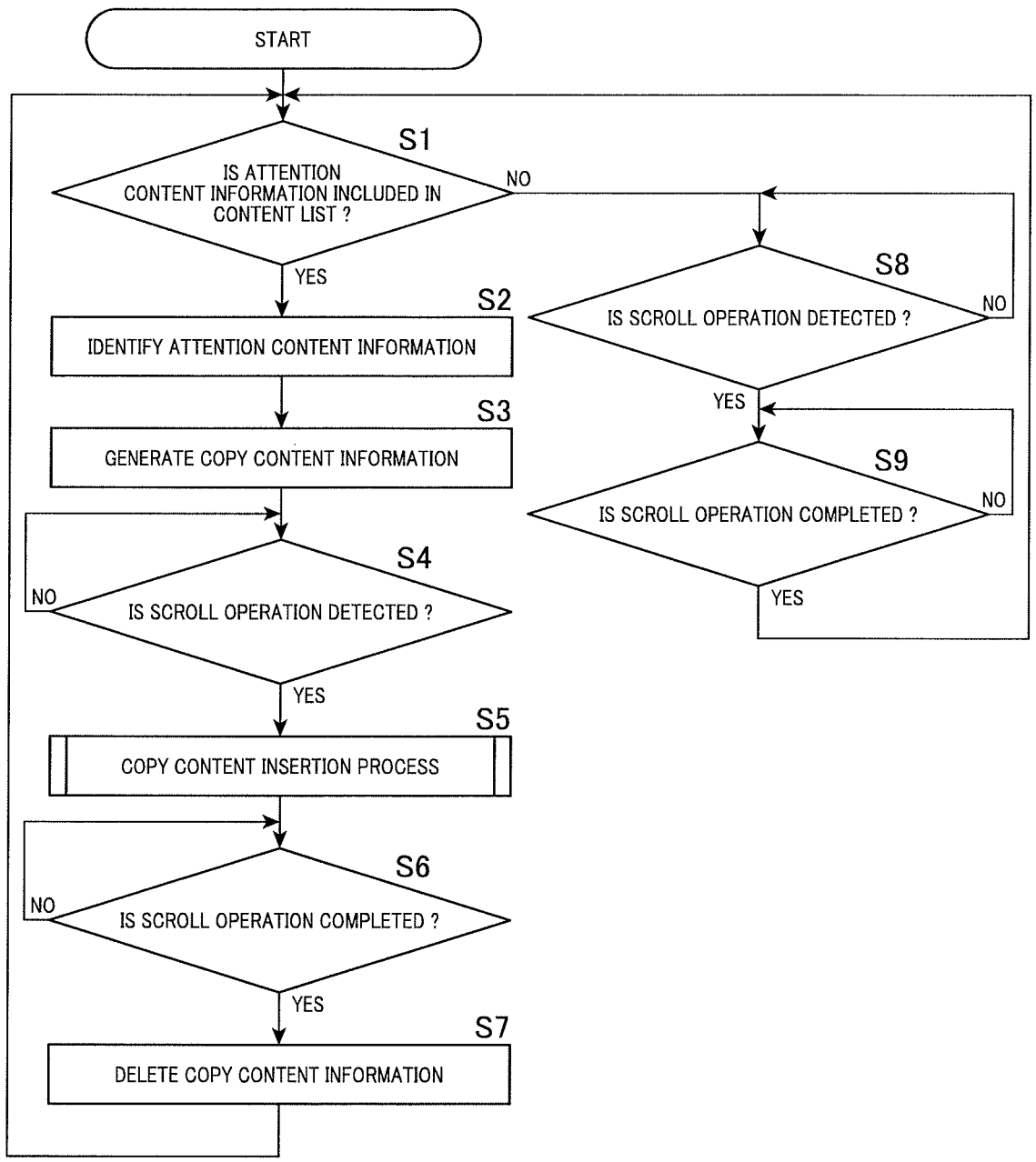
FIG. 5 is a flowchart showing a copy content information display process according to Example 1.
Figure 6:
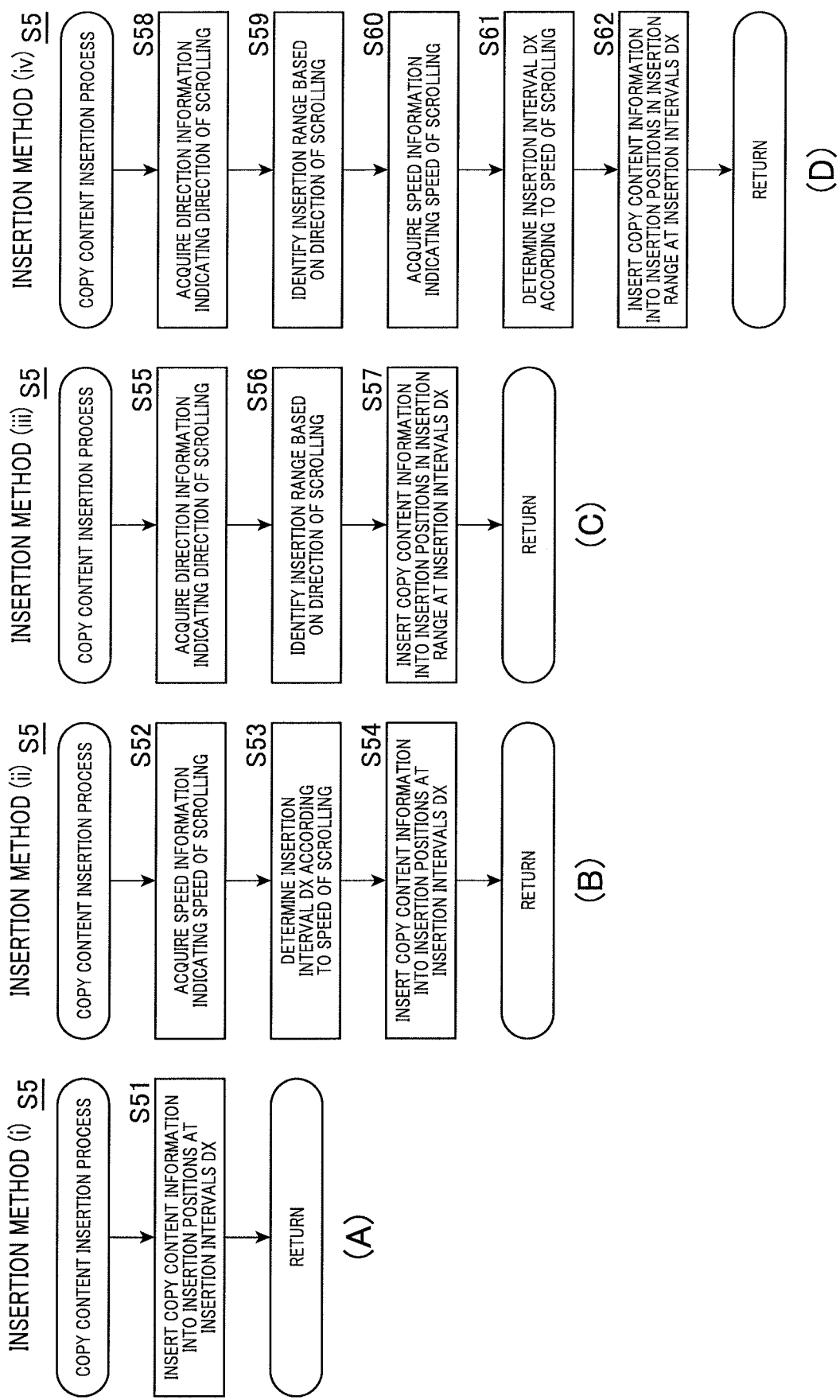
FIGS. 6(A) to 6(D) are flowcharts showing details of a copy content insertion process in step S51 shown in FIG. 5.

First, the copy content information display process in Example 1 will be described with reference to FIGS. 5 to 8 and the like. In Example 1, the copy content information display process in case that the repetitive display during scrolling is performed will be described. FIG. 5 is a flowchart showing the copy content information display process according to Example 1. FIGS. 6(A) to 6(D) are flowcharts showing details of a copy content insertion process in step S51 shown in FIG. 5. FIGS. 7(A) and 7(B) are diagrams showing display examples of web pages according to Example 1. FIGS. 8(A) to 8(C) are conceptual diagrams showing insertion positions of the copy content information in the arrangement. In the process shown in FIG. 5, in particular, a process related to the scroll operation is described and processes related to user operations other than the scroll operation are omitted from the figure for convenience of description.

The process shown in FIG. 5 is started in case that the user terminal T1 receives a structured document file and the like of a web page for displaying a content list from the information providing server SA and, for example, as shown in FIG. 7(A), the web page is displayed on the window screen. On the web page shown in FIG. 7(A), a partial area 50 of the content list is displayed. The partial area 50 of the content list includes a plurality of pieces of content information C3 to C9. The copy content information display process is performed according to a script described in the structured document of the web page.

In step S1 shown in FIG. 5, the system control unit 27 determines whether or not attention content information is included in the content list displayed on the window screen. For example, this determination is performed by determining whether or not id defined by a div tag that defines the content information displayed on the window screen has a number system of exhibited item ID of attention content information. Or, the determination is performed by determining whether or not a value that characterizes content information to be attention content information is defined on the div tag that defines the content information.

If the system control unit 27 determines that attention content information is included in the content list displayed on the window screen (step S1, YES), the system control unit 27 identifies the attention content information (for example, identifies the attention content information defined by div tag (data surrounded by <div> and </div>)) (step S2) and proceeds to step S3. In the example shown in FIG. 7(A), the content information C7 (attention) corresponds to the attention content information. In case that a plurality of pieces of attention content information is included in the content list, each piece of attention content information is identified. On the other hand, if the system control unit 27 determines that attention content information is not included in the content list displayed on the window screen (step S1: NO), the system control unit 27 proceeds to step S8.

Even in case that the attention content information is not included in the content list currently displayed on the window screen, if the attention content information is included in the content list that can be displayed by scrolling, it may be configured so that it is determined in the step S1 that the attention content information is included.

In step S3, the system control unit 27 generates copy content information which is a copy (duplicate) of the identified attention content information described above. For example, the attention content information defined by div tag (data surrounded by <div> and </div>) is copied as the copy content information from the structured document of the web page, so that the copy content information is generated. In case that a plurality of pieces of attention content information is identified in the step S2, copy content information of each piece of attention content information is generated. It may be configured so that the copy content information is generated after the scroll operation is detected.

Next, the system control unit 27 determines whether or not the scroll operation is detected which causes the display content including the content list displayed on the window screen to be scrolled (step S4). For example, the scroll operation is detected when an operation signal according to the scroll operation is inputted from the operation unit 21. In case that a user operation other than the scroll operation is detected during a period of time from when the copy content information is generated to when the scroll operation is detected, a process according to the user operation interrupts. If the system control unit 27 detects the scroll operation (step S4: YES), the system control unit 27 starts a scroll process according to the scroll operation and performs a copy content insertion process (step S5).

In the copy content insertion process, the copy content information is inserted into a plurality of insertion positions in the arrangement in the content list, so that as shown in FIG. 7(B), the copy content information (C7 (copy)) is displayed on the window screen (displayed by a web browser function) during scrolling after the scrolling is started. Here, the insertion of the copy content information is realized by configuring so that an empty div tag (for example, the inside surrounded by <div> and </div> is empty) is described between div tags (data surrounded by <div> and </div>) that define content information (that is, a div tag that defines content information and an empty div tag are alternately described) in advance in the structured document of the web page and the empty tag is changed to (in other words, replaced by) a div tag (data surrounded by <div> and </div>) that defines the generated copy content information. Or, the insertion of the copy content information is realized by adding a div tag (data surrounded by <div> and </div>) that defines the generated copy content information as an element to any position in a DOM (Document Object Model) tree that can be extracted from the structured document of the web page (for example, adding the div tag by an appendChild( ) method defined by a script).

Here, as examples of a copy content information insertion method performed by the copy content insertion process, there are insertion methods (i) to (iv) described below.

[Case of Insertion Method (i)]

In this case, in step S51 shown in FIG. 6(A), the system control unit 27 causes the generated copy content information to be inserted into a plurality of insertion positions in the arrangement at predetermined insertion intervals DX on the basis of, for example, the position of the attention content information corresponding to the copy content information in the arrangement. Here, the insertion interval DX corresponds to, for example, the number of pieces of content information sandwiched between the insertion positions. For example, in case that the insertion interval DX is "3", the number of pieces of content information sandwiched between the copy content information (or the attention content information corresponding to the copy content information) and the copy content information is "3". The insertion interval DX is set by, for example, a script in advance. Or, it may also be configured so that the number of insertions of the copy content information (the number of increased pieces of copy content information) to be inserted into the content list that can be displayed on the web page is set by, for example, a script and the system control unit 27 calculates the insertion intervals DX based on the number of insertions (for example, calculates the insertion intervals DX so that the insertion intervals DX are even).

In the example shown in FIG. 8(A), a plurality of pieces of copy content information (C7 (copy)) of the attention content information (C7 (attention)) are inserted into a plurality of insertion positions at the insertion intervals DX in a display target range 100 which is a display target displayed in the window screen before scrolling in the arrangement and in non-display target ranges 101 and 102 which are not display targets displayed in the window screen before scrolling in the arrangement. Here, in case that scrolling in the "direction of the scrolling" (in the dashed line arrow direction) in FIG. 8(A), the non-display target range 101 is an area (first area) to be a display target displayed in the window screen by the scrolling and the non-display target range 102 is an area (second area) not to be a display target displayed in the window screen by the scrolling (however, if the direction of the scrolling is changed, the areas are reversed). In the case of the insertion method (i), since the direction of the scrolling is not detected, the copy content information is inserted into a plurality of insertion positions in the non-display target ranges 101 and 102 in each direction with respect to the window screen regardless of the direction of the scrolling (upward direction in the example shown in FIG. 8(A)). It may also be configured so that the copy content information is not inserted into the display target range 100. According to the insertion method (i), it is possible to cause the copy content information of the attention content information to repeatedly appear on the window screen regardless of the direction of the scrolling during the scrolling. As a result, it is possible to reduce a processing load to detect the direction of the scrolling.

As another example of the insertion method (i), it may be configured so that the system control unit 27 generates the copy content information in the step S3 and thereafter inserts the copy content information into a plurality of insertion positions in the arrangement at predetermined insertion intervals DX and sets non-display setting (setting to be invisible on the window screen) on the inserted copy content information. For example, the non-display setting is performed by using a visibility property (for example, <div style="visibility: hidden" . . . , is set) in the style section of the copy content information (data surrounded by <div> and </div>) (in this case, the display area of the copy content information becomes blank). Or, the non-display setting is performed, for example, by using a display property (for example, <div style="display: none" . . . , is set) (in this case, the display area of the copy content information does not become blank and the display area is filled with display areas of the previous and the next copy content information). In case that the non-display setting is performed, it is configured so that the system control unit 27 releases the non-display setting (that is, changes to the display setting) on the copy content information that has already been inserted instead of inserting the copy content information into a plurality of insertion positions in the step S51. The release of the non-display setting is performed by, for example, setting <div style="visibility: visible" . . . , or deleting "display: none" from <div style="display: none" . . . .

[Case of Insertion Method (ii)]

In this case, in step S52 shown in FIG. 6(B), the system control unit 27 acquires speed information indicating the speed of the scrolling. Here, the speed of the scrolling can be calculated by, for example, dividing the amount of movement of a certain pixel on a web page whose position is changed by the scrolling by the time required for the movement (the duration time of the scrolling). The "amount of movement" corresponds to, for example, a distance between first coordinates (x1, y1) and second coordinates (x2, y2) in case that a certain pixel displayed on the window screen moves from the first coordinates with the upper left corner of the window screen as the origin to the second coordinates.

Next, the system control unit 27 determines the insertion interval DX according to the speed indicated by the acquired speed information (step S53). In this case, for example, information (for example, a table or a calculation formula) indicating a correspondence relationship between the speed and the insertion interval (defined by, for example, either one of the number of pixels, the length, and the number of sandwiched pieces of content information) is defined in a script described in the structured document of the web page and the system control unit 27 determines the insertion interval DX so that the faster the speed indicated by the acquired speed information is, the larger the insertion interval DX is by referring to the information indicating the correspondence relationship. This is because in case that the speed of the scrolling is fast, the speed at which the copy content information moves on the window screen is fast, so that it is difficult for a user to observe the copy content information when the insertion interval of the copy content information is small (eyes of the user cannot follow).

Next, the system control unit 27 causes the generated copy content information to be inserted into a plurality of insertion positions in the arrangement at the insertion intervals DX determined in the step S53 on the basis of, for example, the position of the attention content information corresponding to the copy content information in the arrangement (step S54). In summary, the system control unit 27 changes the insertion interval DX according to the speed of the scrolling in case of causing a plurality of pieces of content information to be inserted into a plurality of different insertion positions. For example, as shown in FIG. 8(A), the system control unit 27 changes the insertion interval DX to be larger (D1) in case that the speed of the scrolling is fast and changes the insertion interval DX to be smaller (D2) in case that the speed of the scrolling is slow. According to such a configuration of the insertion method (ii), it is possible to cause the copy content information of the attention content information to repeatedly appear on the window screen at intervals for the user to easily see the copy content information according to the speed of the scrolling during the scrolling.

It may also be configured so that the system control unit 27 changes the number of insertions of the copy content information according to the speed of the scrolling in case of causing a plurality of pieces of content information to be inserted into a plurality of different insertion positions. In this case, the system control unit 27 determines the number of insertions according to the speed indicated by the acquired speed information in the step S53. For example, information indicating a correspondence relationship between the speed and the number of insertions (for example, a table or a calculation formula) is defined in a script described in the structured document of the web page and the system control unit 27 determines the number of insertions so that the faster the speed indicated by the acquired speed information is, the greater the number of insertions is by referring to the information indicating the correspondence relationship. In this case, for example, the system control unit 27 calculates the insertion intervals DX based on the determined number of insertions (for example, calculates the insertion intervals DX so that the insertion intervals DX are even) and causes the copy content information to be inserted at the insertion intervals DX. According to such a configuration, it is possible to cause the copy content information of the attention content information to repeatedly appear on the window screen with the number of pieces of copy content information for the user to easily see the copy content information according to the speed of the scrolling during the scrolling. The number of insertions of the copy content information may be the number of pieces of copy content information that are displayed on the window screen at the same time.

[Case of Insertion Method (iii)]

In this case, in step S55 shown in FIG. 6(C), the system control unit 27 acquires direction information indicating the direction of the scrolling. Here, the direction of the scrolling can be identified from, for example, the display position of a certain pixel on the web page when the scroll operation is started and the display position of the certain pixel whose position is changed by the scrolling. Next, the system control unit 27 identifies an insertion range on the basis of the direction of the scrolling (step S56). Specifically, the system control unit 27 identifies the display target range 100 (an example of the insertion range) and identifies the non-display target range 101 (an example of the insertion range) to be a display target displayed in the window screen by the scrolling from the non-display target ranges 101 and 102 which are not display targets displayed in the window screen before the scrolling is started on the basis of the acquired direction information (step S56). In other words, the non-display target range 101 is identified which is in a direction opposite to the direction of the scrolling (the arrow direction shown in FIG. 8(B)) with respect to the window screen. It may also be configured so that the display target range 100 is not identified. Then, the system control unit 27 causes the generated copy content information to be inserted into a plurality of insertion positions in the display target range 100 and the identified non-display target range 101 at predetermined insertion intervals DX (step S57). According to such a configuration of the insertion method (iii), it is possible to cause the copy content information of the attention content information to repeatedly and effectively appear on the window screen according to the direction of the scrolling during the scrolling, so that it is possible to reduce the number of insertions of the copy content information to be smaller than that of the insertion method (i).

As another example of the insertion method (iii), it may be configured so that the system control unit 27 generates the copy content information in the step S3 and thereafter inserts the copy content information into a plurality of insertion positions in the arrangement at predetermined insertion intervals DX and sets non-display setting on the inserted copy content information. In this case, it is configured so that the system control unit 27 releases the non-display setting on the copy content information inserted into the non-display target range 101 identified in the step S56 among the copy content information that has already been inserted instead of inserting the copy content information into a plurality of insertion positions in the step S57 (the non-display setting on the copy content information inserted into the non-display target range 102 which is not identified in the step S56 is not released).

[Case of Insertion Method (iv)]

In this case, in steps S58 and S59 shown in FIG. 6(D), in the same manner as the processes in steps S55 and S56 shown in FIG. 6(C), the display target range 100 and the non-display target range 101 are identified. It may also be configured so that the display target range 100 is not identified. Then, in steps S60 and S61 shown in FIG. 6(D), in the same manner as the processes in steps S52 and S53 shown in FIG. 6(B), the insertion interval DX according to the speed of the scrolling is determined. In the same manner as in the insertion method (ii), it may also be configured so that the number of insertions according to the speed of the scrolling is determined and the insertion interval DX is calculated based on the determined number of insertions. Then, the system control unit 27 causes the generated copy content information to be inserted into a plurality of insertion positions in the identified non-display target range 101 at the determined or calculated insertion intervals DX (step S62). According to such a configuration of the insertion method (iv), it is possible to cause the copy content information of the attention content information to repeatedly and effectively appear on the window screen at intervals (or, by the number of pieces of copy content information) for the user to easily see the copy content information according to the speed of the scrolling during the scrolling and according to the direction of the scrolling.

In step S61, as shown in FIG. 8(C), it may be configured so that the system control unit 27 changes the insertion interval DY from the lower end of the display target range 100 to the closest insertion position according the speed of the scrolling in the identified non-display target range 101. In this case, for example, information indicating a correspondence relationship between the speed and the insertion interval (for example, a table or a calculation formula) is defined in a script described in the structured document of the web page and the system control unit 27 determines the insertion interval DY so that the faster the speed indicated by the acquired speed information is, the larger the insertion interval DY is by referring to the information indicating the correspondence relationship. For example, as shown in FIG. 8(C), the system control unit 27 changes the insertion interval DY to be larger (D3: that is, the insertion interval DY is inserted into a position farther away from the window screen) in case that the speed of the scrolling is fast and changes the insertion interval DY to be smaller (D4) in case that the speed of the scrolling is slow. According to this configuration, it is possible to adjust the period of time from when the scrolling is started to when the copy content information of the attention content information appears on the window screen according to the speed of the scrolling. As a result, it is possible to facilitate the user to see the copy content information. In the example shown in FIG. 8(C), the insertion interval DX after the content information C16 may be set in advance or may be determined according to the speed of the scrolling.

Meanwhile, in the step S3, if copy content information is generated for each of a plurality of pieces of attention content information, an adjustment is performed in the process in the step S5 so that an interval between the copy content information of certain attention content information and the copy content information of other attention content information is greater than or equal to a predetermined insertion interval.

When the copy content insertion process is performed in this way, the system control unit 27 determines whether or not the scroll operation is completed (in other words, determines whether or not the scrolling according to the scroll operation is stopped) (step S6). For example, after an operation signal according to the scroll operation from the operation unit 21 is inputted into the system control unit 27, when the input of the operation signal is discontinued for a predetermined period of time (for example, 0.5 seconds), it is determined that the scroll operation is completed. Then, if the system control unit 27 determines that the scroll operation is completed (step S6: YES), the system control unit 27 deletes the copy content information that is inserted into the insertion positions by the copy content insertion process (for example, deletes the div tags that define the copy content information from the structured document) (step S7). Thereby, if the copy content information is displayed on the window screen when the scrolling is stopped, the system control unit 27 causes the copy content information (that is, all the copy content information) to be non-display (display is deleted). According to this configuration, when the scrolling is stopped, it is possible to prevent the copy content information of the attention content information from being an obstacle for the user to browse other content information. It may be configured so as to cause the copy content information to be non-display by setting the non-display setting on the copy content information.

As another example of the step S7, it may be configured so that in case that a plurality of pieces of copy content information is displayed on the window screen when the scrolling is stopped (for example, when it is determined that the scroll operation is completed), at least any one piece of copy content information among the plurality of pieces of copy content information is continuously displayed and the other pieces of copy content information except for the one piece of copy content information to be continuously displayed are set to non-display (for example, div tags that define the copy content information are deleted from the structured document). For example, if three pieces of copy content information are displayed on the window screen when the scrolling is stopped, the display of one piece of copy content information remains and the other pieces of copy content information except for the one piece of copy content information are set to non-display (in other words, apart of the pieces of copy content information are set to non-display). According to this configuration, when the scrolling is stopped, it is possible to prevent the copy content information of the attention content information from being an obstacle for the user to browse other content information and it is also possible to facilitate the user to continuously pay attention to (facilitate the user to pay attention to) the attention content information.

After the process of the step S7 is completed, the system control unit 27 returns to step S1 and performs the same processes as described above on the window screen after the scrolling. If the attention content information is included in the content list that can be displayed by scrolling, if it is determined in the step S1 that the attention content information is included, the copy content information has already been generated, so that the system control unit 27 may return to step S4.

On the other hand, in step S8, the system control unit 27 determines whether or not the scroll operation is detected in the same manner as in the step S4. In case that a user operation other than the scroll operation is detected during a period of time until when the scroll operation is detected, a process according to the user operation interrupts. In case that the scroll operation is detected (step S8: YES), a scroll process is started according to the scroll operation. Next, the system control unit 27 determines whether or not the scroll operation is completed (step S9) and if the system control unit 27 determines that the scroll operation is completed (step S9: YES), the system control unit 27 returns to step S1.

As described above, according to Example 1, it is configured so as to cause the copy content information of the attention content information included in the content list displayed on the window screen to be inserted into a plurality of insertion positions in the arrangement in the content list and cause the copy content information to be repeatedly displayed on the window screen during scrolling. Therefore, even in case that the attention content information is moved out of the window screen (in other words, even in case that the attention content information is framed out) by the scrolling, it is possible to increase opportunities for the content information to appear (be exposed) and facilitate the content information to be paid attention to by the user while preventing the content information from disturbing user's browsing more than necessary.

As a modified form of Example 1 described above, it may be configured so that the copy content information display process is led and performed by the system control unit 4 of the information providing server SA. In this case, the system control unit 4 of the information providing server SA functions as an attention content information identification means, an insertion means, a display control means, a direction information acquisition means, and a speed information acquisition means, and the like in the present invention. In this case, all or part of the copy content information display process is defined by a server program.

Hereinafter, a case in which the copy content information display process shown in FIG. 5 is performed by the system control unit 4 will be described. In the copy content information display process shown in FIG. 5, the detailed description of the same processes as those performed by the system control unit 27 will be omitted. In this case, for example, the process shown in FIG. 5 is started in case that a structured document file and the like of a web page for displaying a content list is transmitted from the information providing server SA to the user terminal T1. In step S1 shown in FIG. 5, the system control unit 4 determines whether or not the attention content information is included in the content list displayed on the window screen by, for example, acquiring information indicating a display range of the web page (for example, coordinates on the web page) displayed on the window screen from the user terminal T1. If the system control unit 4 determines that attention content information is included in the content list (step YES), the system control unit 4 identifies the attention content information (step S2) and proceeds to step S3.

In the same manner as in Example 1, even in case that the attention content information is not included in the content list currently displayed on the window screen, if the attention content information is included in the content list that can be displayed by scrolling, it may be configured so that it is determined in the step S1 that the attention content information is included. In this case, it is not necessary to acquire the information indicating the display range of the web page displayed on the window screen from the user terminal T1.

In step S3, the system control unit 4 generates copy content information which is a copy of the identified attention content information described above. Next, the system control unit 4 detects the scroll operation (step S4: YES) by acquiring information indicating that there is a scroll operation from the user terminal T1 and performs the copy content insertion process (step S5).

In the copy content insertion process, the system control unit 4 determines the insertion interval and the insertion positions by any one of the insertion methods (i) to (iv) described above and transmits the copy content information (data surrounded by <div> and </div>) generated in the step S3 and information necessary to cause the copy content information to be inserted, such as the insertion interval and the insertion positions, to the user terminal T1, so that the system control unit 4 causes the copy content information to be inserted into some insertion positions in the arrangement in the content list (step S51, S54, S57, or S62). Thereby, the copy content information is displayed on the window screen (displayed by a web browser function) during scrolling after the scrolling is started. This process is performed by using, for example, Ajax without refreshing the entire web page. In the case of the insertion methods (ii) and (iv), the information (for example, a table or a calculation formula) indicating a correspondence relationship between the speed and the insertion interval is stored in the storage unit 2 and the system control unit 4 acquires the speed information indicating the speed of the scrolling from the user terminal T1. In the case of the insertion methods (iii) and (iv), the system control unit 4 acquires the direction information indicating the direction of the scrolling from the user terminal T1.

If the system control unit 4 determines that the scroll operation is completed by acquiring information indicating that the scroll operation is completed from the user terminal T1 (step S6: YES), the system control unit 4 transmits a command to cause the copy content information inserted into the insertion positions by the copy content insertion process to be deleted (or to be invisible) to the user terminal T1 (step S7). Thereby, if the copy content information is displayed on the window screen when the scrolling is stopped in the user terminal T1, the system control unit 4 causes the copy content information to be non-display. It may be configured so that the system control unit 4 transmits a command to cause at least any one piece of copy content information among the plurality of pieces of copy content information to be continuously displayed and cause the other pieces of copy content information except for the copy content information that is to be continuously displayed to be non-display to the user terminal T1. The processes thereafter are basically the same as those described above, so that the description thereof is omitted.

Example 2

Next, the copy content information display process in Example 2 will be described with reference to FIGS. 9 and 10 and the like. In Example 2, the copy content information display process in case that the restoration display is performed will be described. FIG. 9 is a flowchart showing the copy content information display process according to Example 2. FIGS. 10(A) and 10(B) are diagrams showing display examples of web pages according to Example 2. In the process shown in FIG. 9, in particular, a process related to the scroll operation is described and processes related to user operations other than the scroll operation are omitted from the figure for convenience of description. In the copy content information display process shown in FIG. 9, the detailed description of the same processes as those of the copy content information display process shown in FIG. 5 will be omitted.

The process shown in FIG. 9 is started in case that the web page is displayed on the window screen in the same manner as the process shown in FIG. 5. In step S21 shown in FIG. 9, the system control unit 27 determines whether or not attention content information is included in the content list (for example, the partial area 50 of the content list shown in FIG. 10(A)) displayed on the window screen. In other words, it is determined whether or not attention content information is displayed on the window screen.

If the system control unit 27 determines that attention content information is included in the content list displayed on the window screen (step S21: YES), the system control unit 27 identifies the attention content information (step S22) and proceeds to step S23. In the example shown in FIG. 10(A), the content information C7 (attention) corresponds to the attention content information. In case that a plurality of pieces of attention content information is included in the content list, each piece of attention content information is identified. On the other hand, if the system control unit 27 determines that attention content information is not included in the content list displayed on the window screen (step S21: NO), the system control unit 27 proceeds to step S28.

In step S23, in the same manner as in the step S3, the system control unit 27 generates copy content information which is a copy of the identified attention content information described above. In case that a plurality of pieces of attention content information is identified in the step S22, copy content information of each piece of attention content information is generated. It may be configured so that the copy content information is generated after the scroll operation is detected (for example, between step S26 and the step S27).

Next, the system control unit 27 determines whether or not the scroll operation is detected which causes the display content including the content list displayed on the window screen to be scrolled (step S24). In case that a user operation other than the scroll operation is detected during a period of time from when the copy content information is generated to when the scroll operation is detected, a process according to the user operation interrupts. If the system control unit 27 detects the scroll operation (step S24: YES), the system control unit 27 performs a scroll process according to the scroll operation.

Next, in the same manner as in the step S6, the system control unit 27 determines whether or not the scroll operation is completed (step S25). If the system control unit 27 determines that the scroll operation is completed (step S25: YES), the system control unit 27 determines whether or not the attention content information identified in the step S22 (that is, the attention content information displayed on the window screen when the scrolling is started) becomes non-display as the scrolling progresses (step S26). In other words, it is determined whether or not the attention content information C7 (attention) is moved out of the window screen as shown in FIG. 10(B). If the system control unit 27 determines that the attention content information does not become non-display as the scrolling progresses (step S26: NO), the system control unit 27 returns to step S21 and performs the same processes as described above. On the other hand, if the system control unit 27 determines that the attention content information becomes non-display as the scrolling progresses (step S26: YES), the system control unit 27 causes the copy content information to be inserted into a certain insertion position (for example, a position close to the lower end of the window screen) in the arrangement in the content list displayed on the window screen (for example, a div tag that defines the copy content information is described in the HTML document in the same manner as in Example 1) (step S27). Thereby, for example, as shown in FIG. 10(B), the copy content information (C7 (copy)) is displayed on the window screen and thereafter the copy content information becomes new attention content information (in other words, the copy content information is succeeded as the original attention content information). As a result, after the process of step S27, when the system control unit 27 returns to step S21, the new attention content information displayed on the window screen is identified and the process in the step S22 and the following processes are performed.

Here, in the step S27, it may also be configured so that the system control unit 27 causes the copy content information to be inserted into the insertion position before the scrolling is started instead of causing the copy content information to be inserted into the insertion position when the scrolling is stopped. In the case of this configuration, the system control unit 27 causes the copy content information to be inserted into a plurality of insertion positions in a non-display state (that is, non-display setting) at insertion intervals shorter than the length of the window screen in a direction in parallel with the direction of the scrolling (for example, at intervals smaller than the vertical width of the window screen shown in FIGS. 7(A) and 7(B)) before the scroll operation is detected (for example, between the steps S23 and S24). Then, for example, as shown in FIG. 10(B), the system control unit 27 causes the copy content information to be displayed on the window screen by switching the copy content information located in the window screen to a display state (in other words, by releasing the non-display setting) when the scrolling is stopped (when the step S25 and the step S26 are YES). If the copy content information is inserted at intervals smaller than the vertical width of the window screen, it is possible to cause at least one piece of copy content information to be displayed even if the scrolling is stopped at any display range on the web page.

In case that the copy content information is generated for each of a plurality of pieces of attention content information in the step S23, the processes of the steps S26 and S27 are performed for each piece of attention content information. If attention content information, which is not displayed on the window screen when the scrolling is started and which is displayed (appears) on the window screen in a period of time from when the scrolling is started to when the scrolling is stopped, becomes non-display as the scrolling progresses, it may be configured so as to cause the copy content information of the attention content information to be displayed on the window screen. In this case, the attention content information is identified, for example, between the steps S24 and S25, and the copy content information of the attention content information is generated, for example, between the steps S26 and S27.

On the other hand, in step S28, the system control unit 27 determines whether or not the scroll operation is detected. In case that a user operation other than the scroll operation is detected during a period of time until when the scroll operation is detected, a process according to the user operation interrupts. In case that the scroll operation is detected (step S28: YES), a scroll process is started according to the scroll operation. Next, the system control unit 27 determines whether or not the scroll operation is completed (step S29) and if the system control unit 27 determines that the scroll operation is completed (step S29: YES), the system control unit 27 returns to step S21 and performs the same processes as described above.

As described above, according to Example 2, it is configured so as to cause the copy content information of the attention content information included in the content list displayed on the window screen to be inserted into a specific insertion position in the arrangement in the content list and thereby cause the copy content information to be displayed on the window screen when the scrolling is stopped. Therefore, even in case that the attention content information is moved out of the window screen by the scrolling, it is possible to increase opportunities for the content information to appear by the restoration of the attention content information and facilitate the content information to be paid attention to by the user while preventing the content information from disturbing user's browsing more than necessary.

Also in Example 2, in the same manner as in the modified form of Example 1 described above, it may be configured so that the copy content information display process is led and performed by the system control unit 4 of the information providing server SA.

DESCRIPTION OF REFERENCE NUMERALS

1 Communication unit
2 Storage unit
3 Input/output interface unit
4 System control unit
5 System bus
21 Operation unit 22 Display unit
23 Communication unit
24 Drive unit
25 Storage unit
26 Input/output interface unit
27 System control unit
28 System bus
Tn User terminal
SA Information providing server
NW Network

The invention claimed is:

1. An information processing device that causes at least a part of a plurality of pieces of content information to be displayed on a display screen of a terminal device according to a predetermined arrangement, the information processing device comprising:
   at least one non-transitory memory operable to store program code; and
   at least one processor operable to read the program code, and operate as instructed by the program code, the program code comprising:
      display control code configured to cause at least one of the at least one processor to display, on the display screen, the plurality of pieces of content information;
      attention content information identification code configured to cause at least one of the at least one processor to identify any one of the plurality of pieces of content information that is displayed on the display screen, as an attention content information, based on predetermined content information to which a user is caused to pay attention; and
      insertion code configured to cause at least one of the at least one processor to insert, into an insertion position in the predetermined arrangement, at least one piece of copy content information that is a duplicate copy of the identified attention content information, and
      wherein the insertion code is further configured to cause at least one of the at least one processor to insert the at least one piece of copy content information into a plurality of insertion positions at a predetermined insertion interval based on a position of the attention content information corresponding to the copy content information, and
      wherein the display control code is further configured to cause at least one of the at least one processor to:
         display, on the display screen, the inserted at least one piece of the copy content information, based on a user operation of scrolling display content comprising the plurality of pieces of content information;
         continuously display, on the display screen, to the user during the scrolling, the inserted at least one piece of the copy content information;
         cease display of all or at least one of the inserted at least one piece of the copy content information displayed on the display screen, when the scrolling is stopped, and
   the program code further comprising:
      speed information acquisition code configured to cause at least one of the at least one processor to acquire speed information indicating a speed of the scrolling,
      wherein the insertion code is further configured to cause at least one of the at least one processor to:
         change a number of insertions of the at least one piece of the copy content information, based on the speed of the scrolling indicated by the acquired speed information, or
         in response to inserting the plurality of pieces of the copy content information into a plurality of different insertion positions, change the insertion interval between the plurality of different insertion positions, based on the speed of the scrolling indicated by the acquired speed information.

2. The information processing device according to claim 1, further comprising:
   direction information acquisition code configured to cause at least one of the at least one processor to acquire direction information indicating a direction of the scrolling, wherein the insertion code is further configured to cause at least one of the at least one processor to:
      identify, based on the acquired direction information, a display target range that is a display area to be displayed on the display screen by the scrolling from a non-display target range that is a display area that is displayed on the display screen before the scrolling is started; and
      insert, into the insertion position in the identified display target range, the at least one piece of the copy content information.

3. The information processing device according to claim 1, wherein the insertion code is further configured to cause at least one of the at least one processor to insert, into the insertion position, the at least one piece of the copy content information when the scrolling is stopped, and
   the display control code is further configured to cause at least one of the at least one processor to display, on the display screen, the at least one pieces of the copy content information when the scrolling is stopped.

4. The information processing device according to claim 1, wherein the insertion code is further configured to cause at least one of the at least one processor to, before the scrolling is started, insert the at least one piece of the copy content information into a plurality of insertion positions in a non-display state, the insertion interval between the plurality of insertion positions being shorter than a length of the display screen in a direction in parallel with a direction of the scrolling, and
   the display control code is further configured to cause at least one of the at least one processor to display, on the display screen, the at least one piece of the copy content information that is located in the display screen, when the scrolling is stopped.

5. The information processing device according to claim 1, wherein the insertion code is further configured to cause at least one of the at least one processor to:
   determine whether the user operation of the scrolling the display content is detected;
   determine whether the user operation of the scrolling the display content is stopped, in response to the determination that the user operation of the scrolling the display content is detected;
   determine whether the identified attention content information is displayed on the display screen, in response to the determination that the user operation of the scrolling the display content is stopped; and
   insert, into the insertion position in the predetermined arrangement, the at least one piece of the copy content information in response to the determination that the identified attention content information is not displayed on the display screen.

6. An information processing method performed by a computer that causes a plurality of pieces of content information to be displayed on a display screen of a terminal device according to a predetermined arrangement, the information processing method comprising:

displaying, on the display screen, the plurality of pieces of content information;

identifying any one of the plurality of pieces of content information that is displayed on the display screen, as attention content information, based on predetermined content information to which a user is caused to pay attention;

inserting, into an insertion position in the predetermined arrangement, at least one piece of copy content information that is a duplicate copy of the identified attention content information;

inserting the at least one piece of copy content information into a plurality of insertion positions at a predetermined insertion interval based on a position of the attention content information corresponding to the copy content information;

displaying, on the display screen, the inserted at least one piece of the copy content information, based on a user operation of scrolling display content comprising the plurality of pieces of content information;

continuously displaying, on the display screen, to the user during the scrolling the inserted at least one piece of the copy content information;

ceasing displaying of all or at least one of the inserted at least one piece of the copy content information displayed on the display screen, when the scrolling is stopped; and acquiring speed information indicating a speed of the scrolling, wherein the inserting the at least one piece of copy content information into the plurality of insertion positions at the predetermined insertion interval further comprises:

changing a number of insertions of the at least one piece of the copy content information, based on the speed information indicating the speed of the scrolling, or in response to inserting the plurality of pieces of the copy content information into a plurality of different insertion positions, changing the insertion interval between the plurality of different insertion positions, based on the speed of the scrolling indicated by the acquired speed information.

7. A non-transitory computer-readable storage medium having stored thereon an information processing program which when executed by a computer, causes the computer to:

display, on a display screen, a plurality of pieces of content information;

identify any one of the plurality of pieces of content information that is displayed on the display screen, as attention content information, based on predetermined content information to which a user is caused to pay attention;

insert, into an insertion position in the predetermined arrangement, at least one piece of copy content information that is a duplicate copy of the identified attention content information;

insert the at least one piece of copy content information into a plurality of insertion positions at a predetermined insertion interval based on a position of the attention content information corresponding to the copy content information;

display, on the display screen, the inserted at least one piece of the copy content information, based on a user operation of scrolling display content comprising the plurality of pieces of content information;

continuously display, on the display screen, to the user during the scrolling the inserted at least one piece of the copy content information;

cease displaying of all or at least one of the inserted at least one piece of the copy content information displayed on the display screen, when the scrolling is stopped; and acquire speed information indicating a speed of the scrolling, wherein the inserting the at least one piece of copy content information into the plurality of insertion positions at the predetermined insertion interval further comprises:

change a number of insertions of the at least one piece of the copy content information, based on the speed information indicating the speed of the scrolling, or in response to inserting the plurality of pieces of the copy content information into a plurality of different insertion positions, change the insertion interval between the plurality of different insertion positions, based on the speed of the scrolling indicated by the acquired speed information.

* * * * *